United States Patent [19]

Gabriel et al.

[11] Patent Number: 4,674,030
[45] Date of Patent: Jun. 16, 1987

[54] LUBRICATING SYSTEM CONTROL CIRCUIT

[75] Inventors: Paul K. Gabriel, West Paterson; David E. Potvin, Wyckoff, both of N.J.; James R. Potvin, Whitinsville, Mass.

[73] Assignee: Bijur Lubricating Corp., Bennington, Vt.

[21] Appl. No.: 573,351

[22] Filed: Jan. 24, 1984

[51] Int. Cl.⁴ .................. G05B 23/02; F01M 1/18
[52] U.S. Cl. ..................... 364/184; 184/6.4; 364/558; 371/62
[58] Field of Search .......... 364/184, 185, 186, 505, 364/506, 558; 184/6, 6.1, 6.14, 6.4, 108; 371/62; 340/626, 679

[56] References Cited

U.S. PATENT DOCUMENTS

| | | | |
|---|---|---|---|
| 3,663,831 | 5/1972 | Cook | 184/6.4 X |
| 3,707,203 | 12/1972 | Roberts | 184/6.4 |
| 3,730,297 | 5/1973 | Colgan et al. | 184/6.4 |
| 4,101,001 | 7/1978 | Smith | 184/6.4 |
| 4,118,792 | 10/1978 | Struger et al. | 364/184 X |
| 4,374,423 | 2/1983 | Kundler et al. | 364/185 X |
| 4,445,168 | 4/1984 | Petryszyn | 364/505 X |
| 4,467,892 | 8/1984 | Van de Bogert | 184/7.4 |

FOREIGN PATENT DOCUMENTS

| | | |
|---|---|---|
| 1237239 | 11/1968 | United Kingdom . |
| 2031631 | 4/1980 | United Kingdom . |
| 2073464 | 10/1981 | United Kingdom . |
| 2082360 | 3/1982 | United Kingdom . |
| 2092665 | 8/1982 | United Kingdom . |
| 2091819 | 8/1982 | United Kingdom . |
| 2098771 | 11/1982 | United Kingdom . |
| 2122002 | 1/1984 | United Kingdom . |

Primary Examiner—Joseph Ruggiero
Attorney, Agent, or Firm—Ostrolenk, Faber, Gerb & Soffen

[57] ABSTRACT

A lubricating system including a fluid distribution system for distribution a lubricating fluid to one or more parts of an operating machine and a control system for controlling the operation of the fluid distribution system is disclosed. The control system generates a system fault signal, which disables the machine being lubricated, a predetermined time period after a fault condition in said fluid distribution system is detected. A fault condition is detected in part by monitoring the output of a low pressure sensor which generates a low pressure fault signal whenever the pressure in the fluid distribution system falls below a predetermined level. Circuitry is provided for ensuring that a system fault signal will not be generated in response to an erroneous low pressure fault signal which may be generated during the initial pressurization of the fluid system. The control system is preferably capable of operating the fluid distribution system in any one of a plurality of modes at the option of the operator of the system.

19 Claims, 7 Drawing Figures

LUBRICATING SYSTEM CONTROL CIRCUIT

BACKGROUND OF THE INVENTION

The present invention is directed towards an automatic lubricating system for applying lubricating fluid to one or more moving parts of an operating machine. More particularly, the present invention is directed towards an improved control circuit for controlling the operation of the automatic lubricating system.

Figure 1:
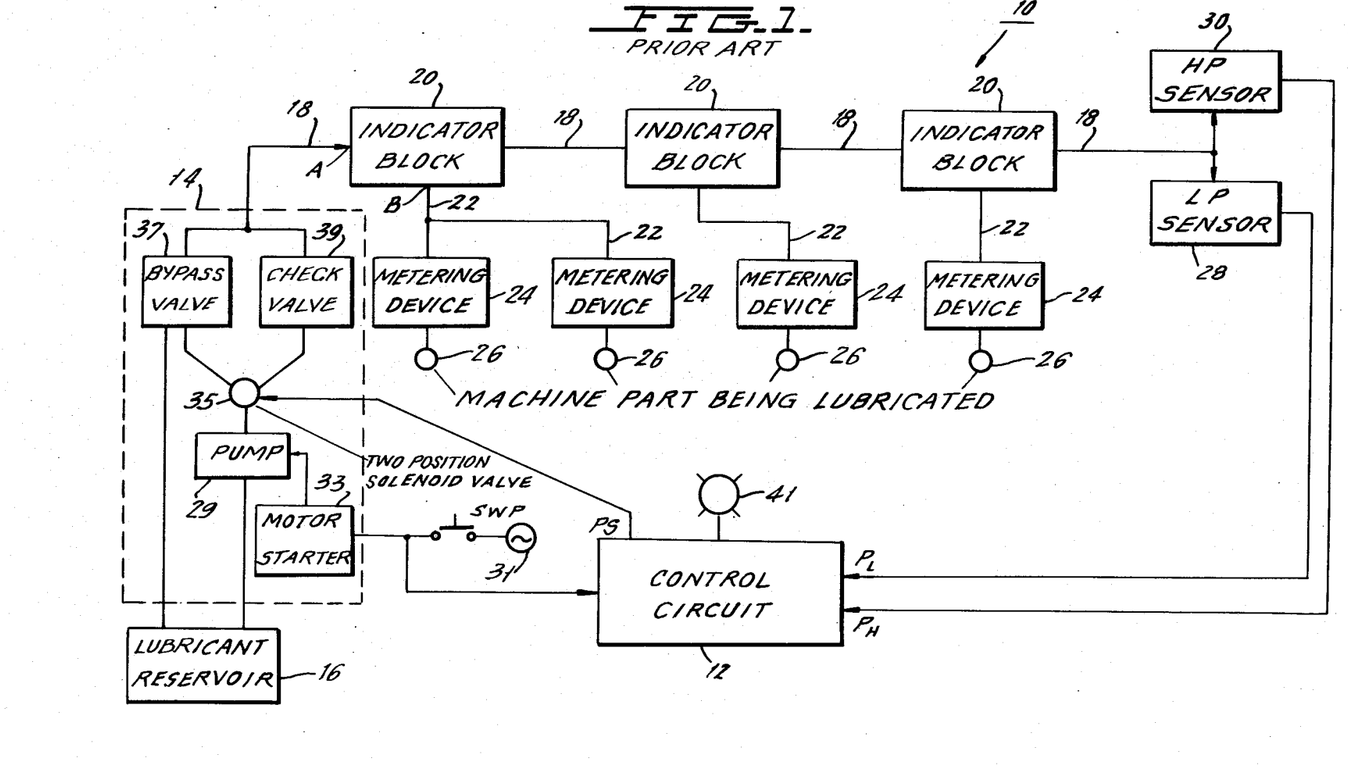
FIG. 1 is a block diagram of a prior art lubricating system.

FIG. 1 is a block diagram of a prior art automatic lubricating system 10 of the type sold by the assignee of the present application. The heart of lubricating system 10 is an electronic control circuit 12 which controls the operation of a fluid supply means 14 which distributes lubricant from a lubricant reservoir 16 to a main fluid line 18. The fluid supply means 14 is operable in both a first pressure mode, wherein it supplies fluid to main fluid line 18 at a rate which will nominally cause the pressure in the line 18 to be maintained at a relatively low level of, for example, 100–200 psi (hereinafter the normal operating pressure) and a second pressure mode wherein it supplies fluid to main fluid line 18 at a second, higher rate, which will nominally cause the pressure in line 18 to be maintained at a relatively high level of, for example, 300 psi (hereinafter the test pressure). As will be explained below, control circuit 12 switches fluid supply means 14 between these two pressure modes by either generating or not generating a pump solenoid signal PS.

The main fluid line 18 supplies lubricating fluid to a plurality of indicator blocks 20 which may take the form illustrated in U.S. Pat. No. 3,730,297. Under normal operating conditions, wherein fluid supply means is operating in the first pressure mode and the normal operating pressure prevails in line 18, each of the indicator blocks will divert a small percentage of the lubricating fluid in line 18 to one or more associated secondary lines 22 each of which terminates at an associated metering device 24. Metering devices 24 may be passive devices, such as a restricted orifice, or may be active devices which feed the lubricating fluid at predetermined times or at a predetermined rate (usually in drops per minute) to a respective machine part 26 of the operating machine being lubricated. As described below, the indicator blocks 20 also detect faults in either the secondary lines 22 or in the metering devices 24 whenever the system 10 is operated under test conditions (wherein the pressure in line 18 is increased to the test pressure level.

The downstream end of the main fluid line 18 terminates at a pair of pressure sensors 28, 30 which detect a fault condition under normal and test operating conditions of the lubrication system, respectively. The sensor 28 is a low pressure sensor and is used to detect faults in the main line 18 during normal operating conditions. This sensor will generate a low pressure fault signal $P_L$ whenever the downstream end of line 18 is below a first predetermined value (e.g., 50 psi) which is selected to be below the normal operating pressure. The sensor 30 is a high pressure sensor and is used to detect faults in either the secondary lines 22 or the meter devices 24 under test operating conditions. This sensor will generate a high pressure fault signal $P_H$ whenever the pressure of the downstream end of main line 18 is below a second predetermined value (e.g., 250 psi) which is substantially higher than the first predetermined value but less than the test pressure level. The high and low pressure fault signals are applied to control circuit 12.

The operator initiates operation of the lubricating system 10 by depressing a main power switch SWP which is a two position bistable switch which is connected between a main A.C. power source 31 (typically a 120 volt, 60 cycle A.C. line) and both the control circuit 12 and a motor starter 33. When the switch SWP is depressed, control circuit 12 is activated and motor starter 33 enables the operation of the motor of pump 29 which forms part of the fluid supply means. The pump 29 pumps fluid from lubricant reservoir 16 at a predetermined rate (typically in cubric centimeters per minute) to a two position solenoid valve 35. Solenoid valve 35 connects the output of pump 29 to either a bypass valve 37 or a check valve 39 under control of a pump solenoid signal PS generated by control circuit 12. When the pump solenoid signal PS is not generated, the solenoid valve 35 is disabled and connects the output of pump 29 to the bypass valve 37. Bypass valve 37 is preferably an adjustable valve which enables the operator of system 10 to control the flow rate at the output of the valve by adjusting a bypass lever which controls the percentage of input fluid which is returned to the reservoir 16. The flow rate at the output of valve 37 will be the flow rate into the valve less the flow rate back to the reservoir 16. The operator of system 10 will adjust the position of the bypass lever so that the pressure in line 18 will be, in the absence of any faults in the distribution system, at normal operating pressure. At this pressure, the desired amount of lubricating fluid will be applied to machine parts 26 but indicator blocks 20 will not be able to detect a fault in either the secondary lines 22 or in the metering devices 24.

In the event of either a blockage or an opening in the main line 18, the pressure at the downstream end of line 18 will fall below the pressure being sensed by low pressure sensor 28 causing the sensor 28 to generate the low pressure fault signal $P_L$. Control circuit 12 responds to this fault signal by enabling a fault light 41 which provides the operator of system 10 with an indication that a fault condition exists. The operator would normally respond to the enabling of lamp 41 by turning off the machine being lubricated and depressing power switch SWP so as to disable the lubricating system 10.

While the low pressure sensor 28 will detect faults in the main line 18, it will not detect faults in the secondary lines 22 or in the metering devices 24. In order to detect such faults, control circuit 12 periodically places fluid supply means 14 in the second pressure mode wherein the pressure in line 18 is increased the test pressure level at which the indicator blocks 20 will sense faults in their associated secondary lines 22 and metering devices 24.

Circuit 12 achieves this result by generating the pump solenoid signal PS which enables the solenoid valve 35 and thereby causes the output of pump 14 to be applied to check valve 39. Check valve 39 is non-adjustable and ensures that the pressure in line 18 will rise to the test pressure level in the absence of any breaks in the fluid distribution system. This pressure is sufficiently high to ensure that indicator blocks 20 will detect any faults in the secondary lines 22 or metering devices 24. In the event that there is a break in one of the secondary lines or in the event that one of more of the metering devices 24 are not restricting the flow of lubricant to the machine parts 24, the pressure across the input terminal A and output terminal B of the associated indicator block 20 will fall below a preset level indicating a fault condition in either the secondary line 22 or the metering device 24. As described in U.S. Pat. No. 3,730,297, the indicator block 20 will respond to this fault condition by dumping a substantial portion of the lubricant in main line 18 to the atmosphere. If the secondary line 22 or the indicator block 24 is blocked, the internal pressure in the indicator block 20 between its input A and its output B will rise above a second predetermined level also indicating a fault condition. Indicator block 20 also responds to this fault condition by dumping a substantial portion of the lubricating fluid in main line 18 to the atmosphere.

Summarizing the foregoing, whenever one of the indicator blocks 20 detects a fault condition in one of its associated secondary lines 22 or metering devices 24, the indicator block 20 will dump a substantial portion of the lubricating fluid in main line 18 to the atmosphere with the result that the pressure at the downstream end of the main line 18 falls below the level being sensed by the high pressure sensor 30 and the high pressure sensor 30 will generate the high pressure fault signal $P_H$. Control circuit 12 detects this signal as indicating a fault condition somewhere in the lubricating system and responds by enabling a fault indicator lamp 41 which informs the operator of system 10 that a fault condition exists. The operator would normally respond to the enabling of lamp 41 by turning off the machine being lubricated and depressing power switch SWP so as to disable the lubricating system 10.

While the automatic lubricating system 10 of the prior art has been generally successful, it exhibits several drawbacks. In the prior art lubricating system, the control circuit 12 continually monitors the low pressure pulse signal $P_L$ during those intervals when the pump 14 is first turned on. Since the pressure in main line 18 is not instantaneously increased to the normal operating pressure, this could result in the control circuit 12 erroneously enabling fault indicator lamp 41 and the operator might unnecessarily shut down the operation of both the lubricating system 10 and the machine being lubricated.

Another drawback of the prior art control circuit 12 is that it did not automatically shut off the machine being lubricated when an actual fault condition was detected with the result that if the user of the system 10 did not notice that the indicator lamp 41 had been enabled, the machine being lubricated could be severely damaged.

Yet another drawback of the prior art control circuits is that they can normally operate in only a single mode of operation. Different control circuits had to be provided to meet the differing needs of end users.

BRIEF DESCRIPTION OF THE INVENTION

In accordance with the foregoing, a primary object of the present invention is to provide a control circuit which generates a system fault signal which can be used automatically shut down the machine being lubricated upon the detection of a non-erroneous fault condition.

If the system fault signal is generated immediately upon the detection of a non-erroneous fault condition, the machine being lubricated will be immediately turned off. While this ensures that the machine being lubricated is not damaged, it is often very costly to the user of the machine. For example, if the machine is involved in a manufacturing process wherein an item being manufactured must be discarded if the operating machine is turned off for even a short period of time (for example, on a gear cutting machine wherein interrupted cuts are not acceptable), it is very costly if the control circuit turns off the operating machine as soon as a fault is detected. If the operator of the machine knows that there are no critical lubricating points in the operating of this machine, whereas means are provided to ensure that lubrication is applied to these points even during a fault condition, the user of the machine will want to ensure that the manufacturing process is completed before the system is shut down. In accordance with the foregoing, another object of the present invention is to provide a control circuit which can delay the generation of a system fault signal upon the detection of a non-erroneous fault condition.

Yet another object of the present invention is to provide a control circuit which ensures that an erroneous low pressure signal generated during the initial pressurization of the lubricating system does not cause the control circuit to either shut down the lubricating system or the machine being lubricated.

Yet another object of the present invention is to provide a control circuit which is operable in a plurality of modes.

These and other objects of the present invention are achieved by providing a control circuit comprising:

a fluid distribution system for distribution a lubricating fluid to one or more parts of an operating machine; and a control system for controlling the operation of said fluid distribution system, said control system including means for detecting a fault condition in said fluid distribution system and for generating a delayed fault signal indicative of the presence of said fault condition a preset time interval after said fault condition is detected.

The present invention is further directed towards a lubricating system, including:

a fluid distribution system for distribution a lubricating fluid to one or more parts of an operating machine; and a fluid supply means for supplying lubricating fluid from a lubricant reservoir to said fluid distribution system at such a rate that the pressure in said fluid distribution system is normally above a predetermined value in the absence of a fault in said fluid distribution system;

a low pressure sensor for generating a low pressure fault signal whenever the pressure at a predetermined location in said fluid distribution system falls below said predetermined level; and a control system for controlling the operation of said fluid distribution system, said control system shutting down said fluid supply means in response to the generation of said low pressure fault signal at any time after an initial low pressure sensor delay time interval which begins when said fluid supply means is first turned on and which ends a sufficient time after said fluid supply means is turned that the pressure of said fluid at said predetermined location in said fluid distribution system will be above said predetermined level in the absence of faults in a main line of said fluid distribution system.

The present invention is further directed towards a lubricating system, comprising:

a fluid distribution system for distributing a lubricating fluid to one or more parts of an operating machine; and a control system for controlling the operation of said fluid distribution system in any one of a plurality of different operating modes at the option of the operator of said system, said modes including:

(a) a first operating mode wherein the pressure of the lubricating fluid in a main fluid distribution line of said fluid distribution system is initially set at a normal operating pressure and is then increased to a high test pressure, substantially higher than said normal operating pressure and is maintained at said high test pressure until said lubricating system is shut down; and (b) a second operating mode wherein the pressure in said main line of said fluid distribution system is switched between said normal operating pressure and said test pressure several times during the operation of said lubricating system.

BRIEF DESCRIPTION OF THE DRAWINGS

For the purpose of illustrating the invention, there is shown in the drawings a form which is presently preferred, it being understood, however, that the invention is not limited to the precise arrangements and instrumentalities shown.

DETAILED DESCRIPTION OF THE PREFERRED EMBODIMENT

Figure 2:
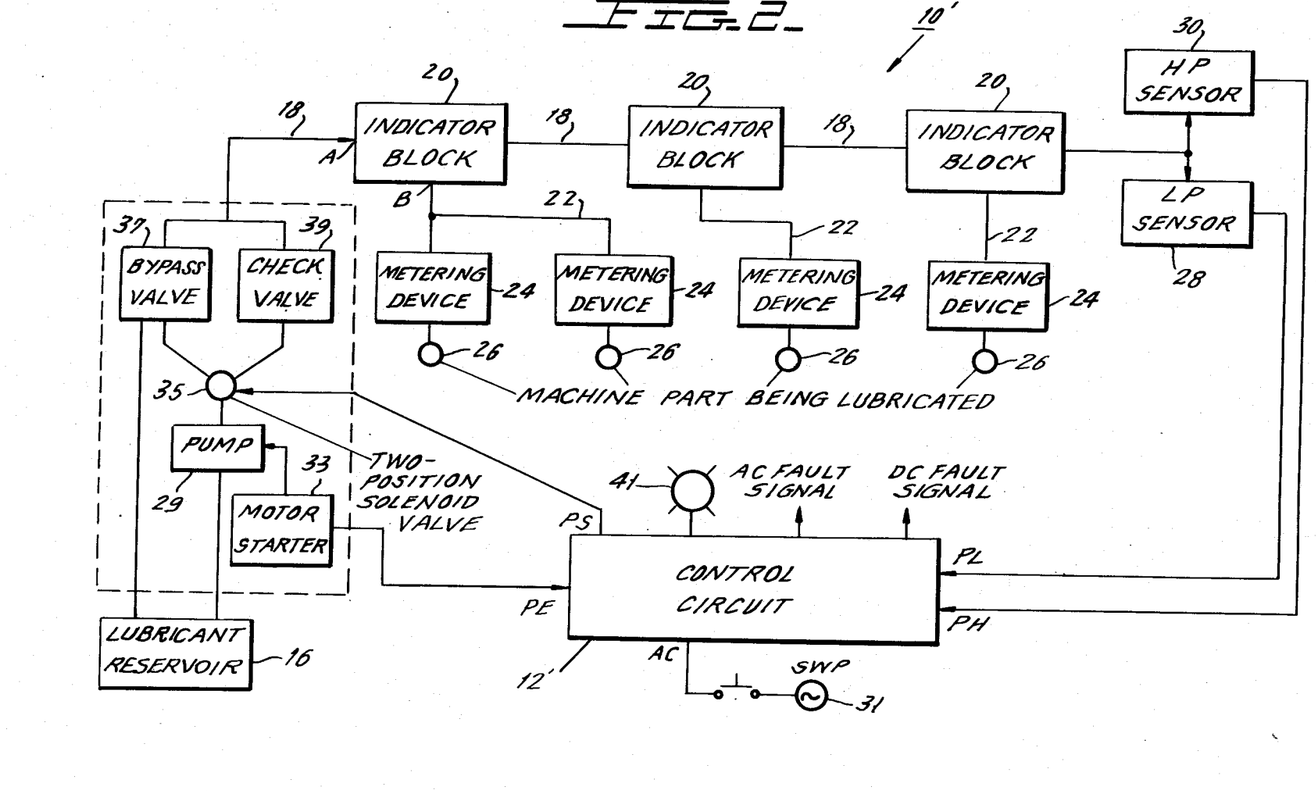
FIG. 2 is a block diagram of a lubricating system contructed in accordance with the principles of the present invention.

Referring now to FIGS. 2-5, wherein like numerals indicate like elements, there is shown in FIG. 2 a lubricating system constructed in accordance with the principles of the present invention and designated generally as 10'. Lubricating system 10' is identical to lubricating system 10 with the exception that the control circuit 12' is substituted for the control circuit 12 and the main power switch SWP' is connected to the motor starter 33 through the control circuit 12' rather than directly as in FIG. 1. When the main power switch SWP is depressed, all of the D.C. components of the control circuit 12' are enabled (the A.C. signal is connected to an A.C. to D.C. converter—not shown—which generates a supply voltage +V applied to the components). The A.C. signal is also applied to the motor starter 33 as the pump enable signal PE. As will be described in greater detail below, control circuit 12' will periodically stop generating the pump enable signal PE whenever the control circuit 12' is operating the lubricating system 10' in a cyclic mode of operation wherein the fluid supply means 14 is periodically shut off. At all other times, the control circuit 12' connects the power source 31 to the motor starter 33 as the pump enable signal PE.

Figure 3:
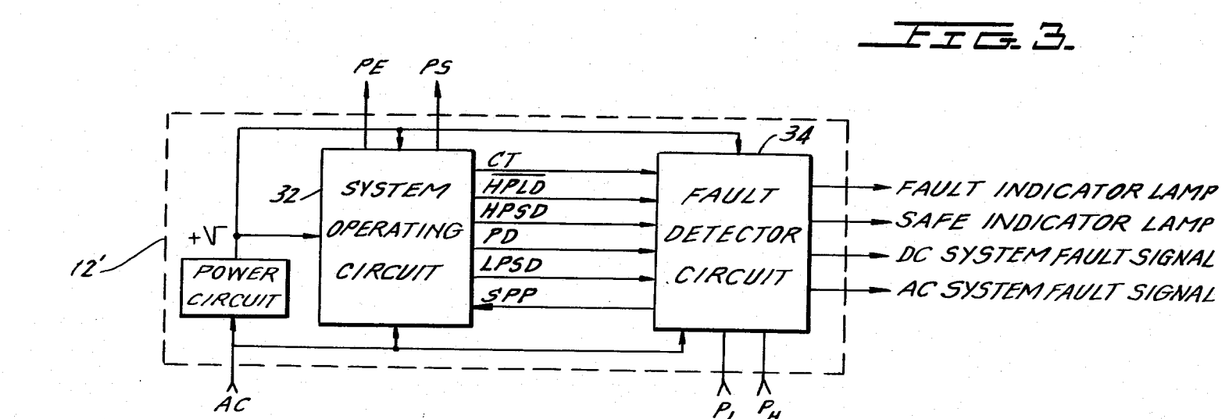
FIG. 3 is a block diagram of the control circuit of the lubricating system of FIG. 2.
Figure 4A:
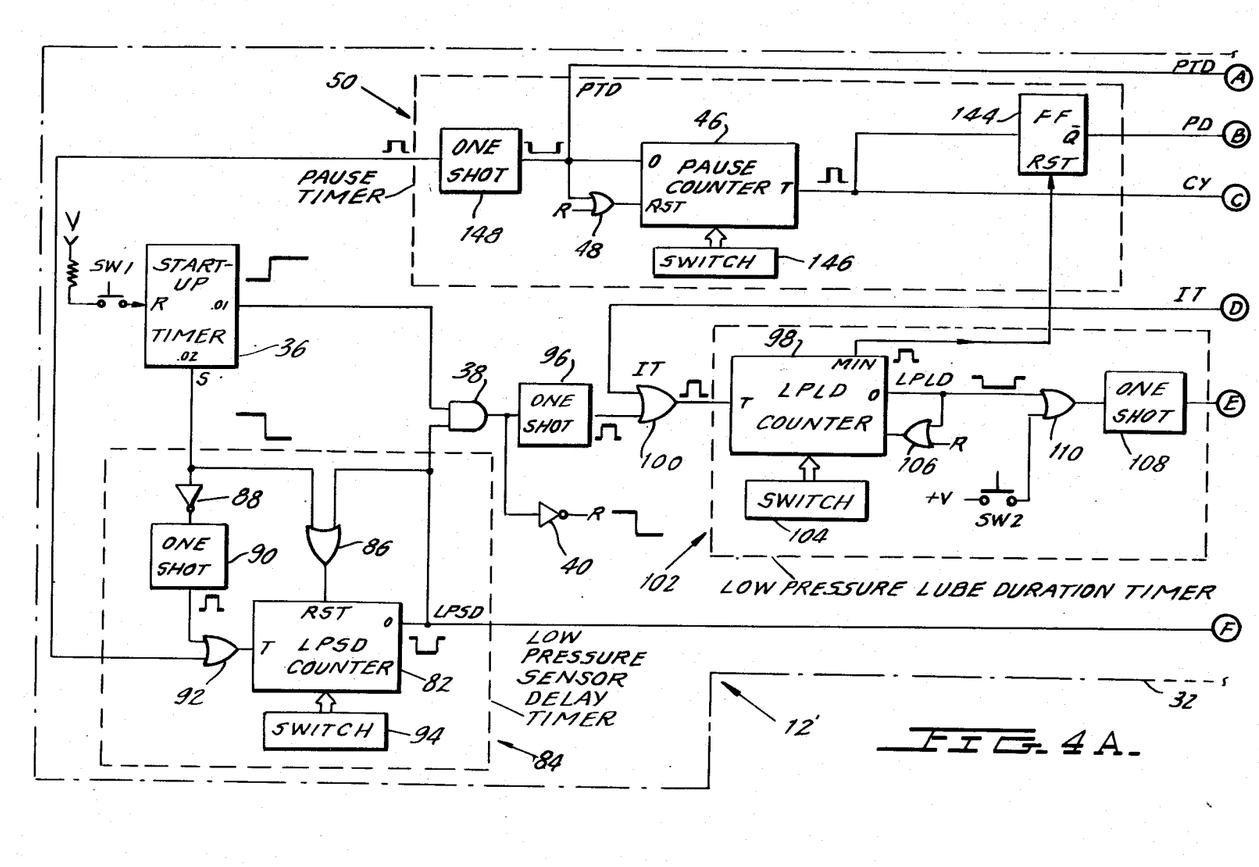
FIGS. 4A, 4B and 4C are a circuit diagram of the control circuit of FIG. 3.
Figure 4B:
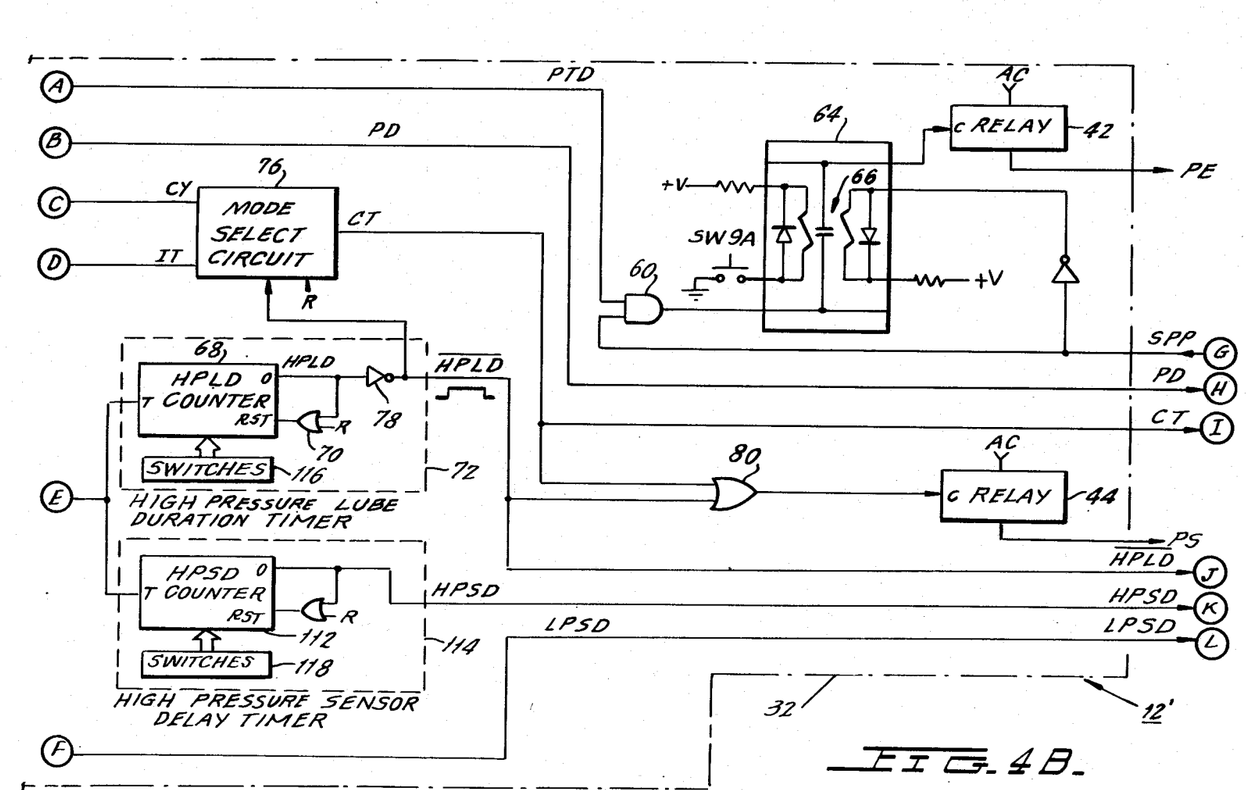
Figure 4C:
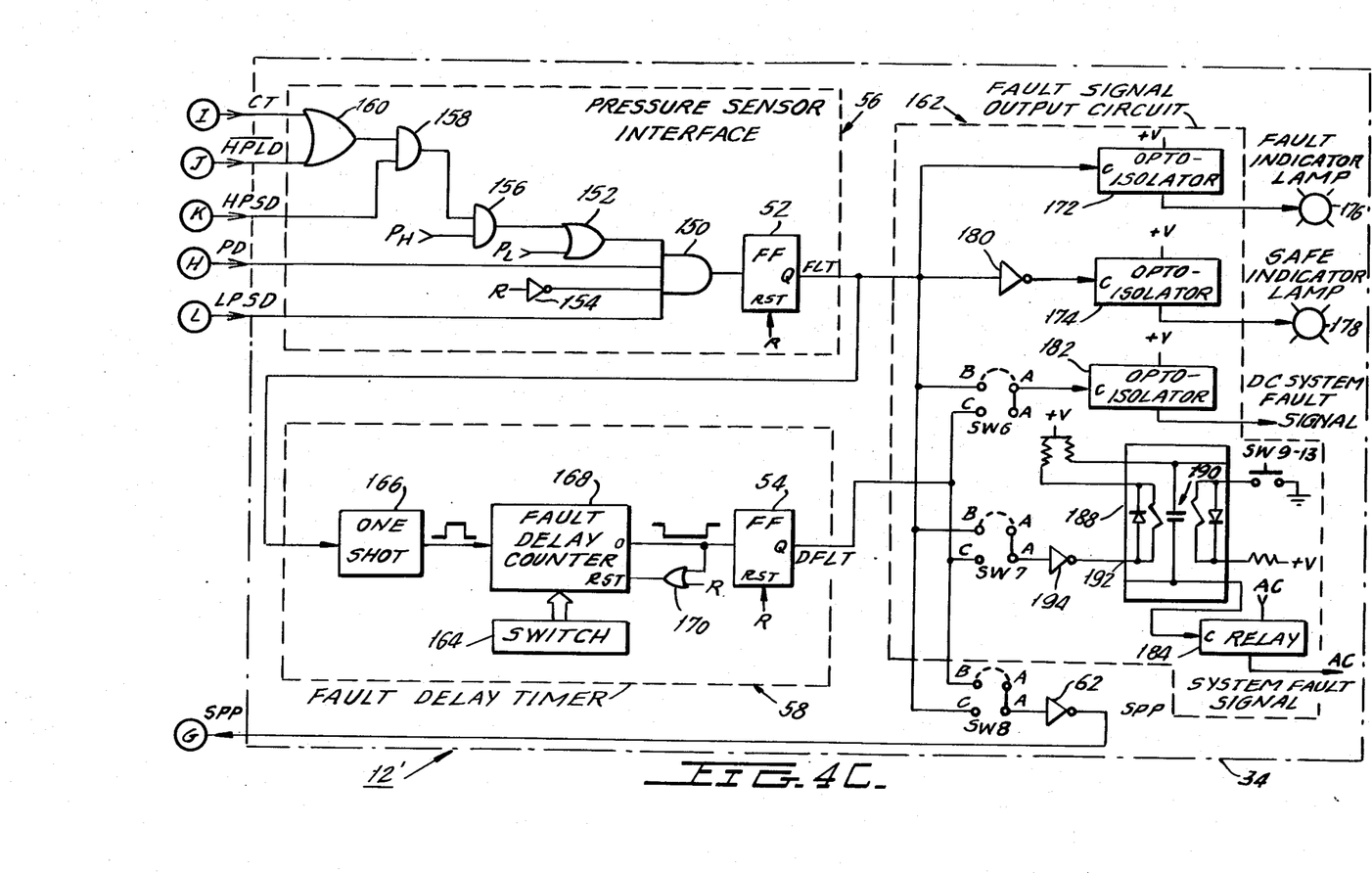
Figure 5:
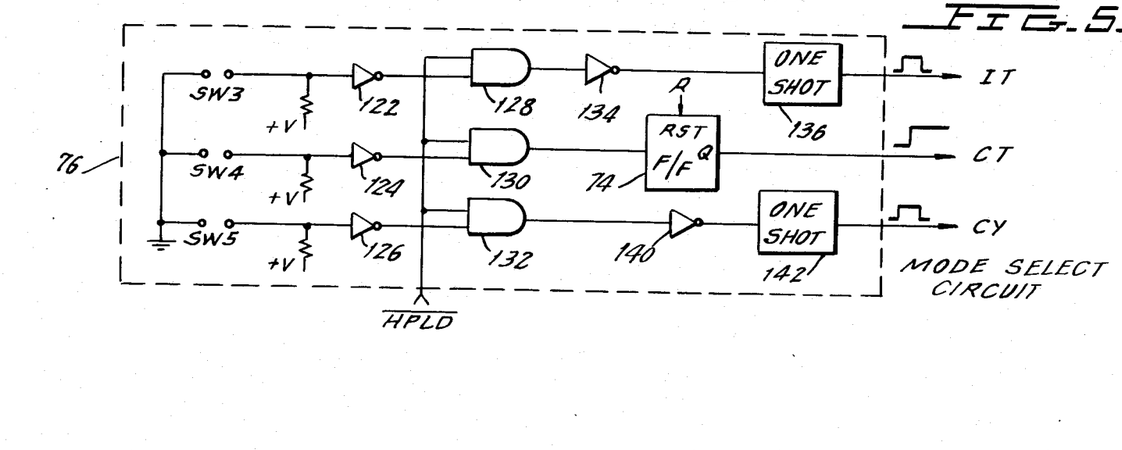
FIG. 5 is a circuit diagram of the mode select circuit shown in block from in FIG. 4B.

The presently preferred structure of control circuit 12' is illustrated in FIGS. 3-5. As best shown in FIG. 3, control circuit 12' includes a system operating circuit 32 and a fault detector circuit 34. The primary function of system operating circuit 32 is to operate the lubricating system 10 in either an intermittent mode of operation, a continuous mode of operation or a cyclic mode of operation, depending upon the requirements of the machine being lubricated. The operator of the lubricating system 10 determines which mode of operation is best for him and causes the system operating circuit 32 to operate in the desired mode by closing an appropriate one of switches SW3, SW4 or SW5 (FIG. 5) as will be described in greater detail below. System operating circuit 32 operates the system 10 in these modes by generating the pump enable and pump solenoid signals in appropriate sequences corresponding to the selected mode.

When operating in the intermittent mode, control circuit 12' normally maintains the pressure in line 18 at the normal operating pressure (e.g., 150 psi) and periodically (e.g., once every two hours for a period of 10 minutes) increases the pressure in line 18 to the test pressure level (e.g., 300 psi). This operation continues as long as power is applied to the lubricating system 10'. In the continuous mode, control circuit 12' initially operates the system 10 at the normal operating pressure for a low pressure lube time interval which is preset by the operator of system 10. At the end of this time interval, control circuit 12' increases the pressure in line 18 to the test pressure and maintains the pressure at that level until the system is shut off. In the cyclic mode of operation, control circuit 12' initially operates the system at the normal operating pressure for a low pressure tube duration time interval selected by the operator of system 10 and increases the pressure in line 18 to the test pressure level at the end of this time period. Control circuit 12' maintains the pressure in line 18 at the test pressure level for a high pressure lube duration time interval determined by the user of system 10. At the end of this period, control circuit 12' will shut off fluid supply means 14 (by disabling pump enable signal PE and thereby shutting off pump 29) with the result that lubricating system 10 stops supplying lubricant to the machine parts 26. Control circuit 12' maintains the system 10 in this state for a pause time interval also selected by the operator of the system. At the end of this time interval, control circuit 12' reenergizes fluid supply means 14 and the entire process is repeated until power to the system 10 is cut off. As a result, lubricant is provided to the machine parts 26 at selected intervals and the test pressure is established in the line 18 for a short period at the end of each of these intervals.

Fault detector circuit 34 monitors the condition of the low and high pressure fault signals $P_L$ and $P_H$ and generates both an A.C. and a D.C. system fault signal when the signals $P_L$, $P_H$ accurately indicate the existence of a fault condition. As noted above, the low pressure sensor 28 will generate an erroneous low pressure fault signal $P_L$ when the pump 14 is first enabled and the pressure in line 18 has not had time to reach the pressure being sensed by sensor 28. To ensure that fault detector circuit 34 does not generate an A.C. or a D.C. fault signal (hereinafter generally system fault signal SF) in response to the low pressure fault signal $P_L$ during this interval, the system operating circuit 32 generates both a low pressure sensor delay signal LPSD and a pause delay signal PD which inhibit the generation of a system fault signal SF. The low pressure sensor delay signal LPSD is generated for a predetermined time period (the low pressure sensor delay time interval) whenever the fluid supply means 14 is first turned on. This interval is adjusted by the operator of system 10 to ensure that the pressure at the downstream end of line 18 will rise above the pressure being monitored by low pressure sensor 28 after the fluid supply means is initially turned on and when there are no faults in the line 18. The pause delay signal PD is generated whenever control circuit 12' disables fluid supply means 14 during the cyclic mode of operation. The generation of either of these signals will present the fault detector circuit 34 from generating an A.C. or a D.C. fault signal in response to the generation of the low pressure fault signal $P_L$ thereby preventing the generation of an erroneous system fault signal SF.

As further noted above, the high pressure sensor 30 will generate a high pressure fault signal $P_H$ both when fluid supply means 14 is operating in the first pressure mode wherein the pressure in line 18 is nominally at the normal operating pressure and for a short time period after the fluid supply means 14 first begins pumping at the higher rate so as to increase the pressure in line 18 to the test pressure. To ensure that fault detector circuit 34 does not generate an erroneous system fault signal SF in response to this erroneous fault signal $P_H$, system operating circuit 32 generates a high pressure sensor delay signal HPSD, a high pressure lube duration signal $\overline{HPLD}$ and a continuous mode signal CT. Either the high pressure lube duration signal $\overline{HPLD}$ or the continuous mode signal CT (exactly when each signal is generated is discussed in greater detail below) will be generated whenever control circuit 12' operates fluid supply means 14 at the higher pump rate. The high pressure sensor delay signal HPSD is generated for a predetermined time interval (the high pressure sensor delay time interval) after the fluid supply means 14 first begins pumping at the higher rate. The duration of this signal is determined by the operator of system 10 and is selected to be sufficiently long to ensure that the pressure at the downstream end of line 18 will increase above the level being sensed by high pressure sensor 30 when the fluid supply means 14 is operating at the higher pumping rate and there are no faults in the lubricating system 10. Fault detector circuit 32 will generate an A.C. and a D.C. fault signal in response to the high pressure fault signal $P_H$ only when one of the signals CT, $\overline{HPLD}$ indicate that the fluid supply means 14 is being operated at the higher pump rate and the signal HPSD indicates that the high pressure sensor delay time interval is over.

Whenever fault detector circuit 34 detects the presence of a non-erroneous fault signal $P_L$ or $P_H$, it generates both the A.C. and the D.C. system fault signals either immediately upon the detection of the fault condition or after a preset delay in time interval, at the option of the operator of system 10. The A.C. and D.C. fault signals will normally be applied to the control circuitry of the machine being lubricated and will cause the machine to shut down. The fault detector circuit 34 will also enable a safe indicator lamp when no fault condition has been detected and will enable a fault indicator lamp immediately after a fault condition has been detected.

Having described the general operation of control circuit 12', the specific structure and operation of the control circuit will now be described with references to FIGS. 4A–4C.

The operation of system operating circuit 32 is initialized by the depression of main power switch SWP which is connected to a power circuit 43 which converts the A.C. signal into a D.C. signal +V of appropriate magnitude. Power circuit 43 will typically include a bridge rectifier and appropriate filtering circuitry. The output of power circuit 43 is connected to the system operating circuit 32 and to the fault detector circuit 34. This signal is applied to the power input of each of the logic chips of these circuits. For simplicity of illustration, however, this connection has not been shown in the drawings except schematically in FIG. 3.

When the main power switch SWP is depressed, D.C. power is applied to start-up timer 36 (see FIG. 4A) which initializes operation of control circuit 12'. Start-up timer 36 serves two purposes: to cause the generation of a reset signal R which resets various counters and flip-flops in the control circuit 12' and to initiate a low pressure sensor delay period during which the fault detector circuit 34 will not respond to the generation of an erroneous low pressure fault signal $P_L$ generated by low pressure sensor 28. To this end, the O1 output of start-up timer 36 initially assumes the binary "0" level upon receipt of the START signal and pulses up to the binary "1" level approximately one second later. The O1 output of start-up timer 36 remains at this level until a new START signal is applied to the trigger input T of timer 36.

The binary "0" initially appearing at the O1 output of start-up timer 36 is applied to an AND gate 38 and causes the output of AND gate 38 to assume the binary "0" level. This signal is inverted by inverter 40 whose output generates a reset signal R which resets various components of control circuit 12' so as to ensure: (1) that the pump 29 of the fluid supply means 14 will be turned on; (2) that the solenoid 32 will be disabled (so as to operate fluid supply means 14 at its lower pump rate); and (3) that the counters 46, 68, 98, 112 of operating circuit 32 will be reset to zero.

The pump 29, and, therefore, the fluid supply means 14, is turned on by a pump enable signal PE which is applied to motor starter 33 (FIG. 2). The pump enable signal PE is generated by an optically isolated solid state relay 42 (FIG. 4C) whose contacts are connected between A.C. source 31 and the motor starter 33. The relay 42 is normally open and will be closed when a binary "1" is applied to its control input C. Whenever the relay is closed, the A.C. source 31 will be connected to the output of relay 42 and the pump enable signal PE will be generated.

In order to ensure that the fluid supply means 14 is initially turned on, the reset signal R is applied to the reset input RST of a pause counter 46 (FIG. 4A) via an OR gate 48 and to the reset inputs RST of the flip-flops 52, 54 of the fault detector circuit 34 (FIG. 4C). Upon receiving the reset signal at its reset input, the output O of counter 46 (FIG. 4A) is set at the binary "1" level. This output defines a pause time duration signal PTD which is at the binary "0" level during a pause time interval during which the fluid supply means 14 is shut off and is at the binary "1" level at all other times. This signal is applied to one input of AND gate 60 (FIG. 4B) thereby enabling the AND gate. The remaining input of AND gate 60 receives the stop pump signal SPP appearing at the output of inverter 62 (FIG. 4C). As will be described in greater detail below, the condition of this signal will be determined by the output of either flip-flop 52 or the output of flip-flop 54 depending upon which contact of the switch SW8 is closed by the operator of system 10. In either event, since the Q output of flip-flops 54 are initially set at the binary "0" level by the reset signal R, the output of inverter 62 will be at the binary "1" level. As a result, the output of AND gate 60 will be at the binary "1" level.

The output of AND gate 60 (FIG. 4B) is applied to a dual coil latching relay 64 which is preferably a Struthers-Dunn MRRDL1AS dual coil latching relay. The contact 66 of this relay is preset in the closed position with the result that the binary "1" appearing at the output of AND gate 60 is applied to the control input of relay 42 causing relay 42 to generate the pump enable signal PE and thereby enable fluid supply means 14. The relay 64 remains latched in this position until a non-erroneous error condition is detected by control circuit 12′. Once such a condition is detected (and after a preset time delay if desired), the contact 66 of latching relay 64 is latched open. Relay 64 will remain in this position (and no power be available to pump 29) until the relay is manually reset by the operator of system 10′ by closing normally open reset switch SW9A. This switch is ganged to reset switch SW9B (FIG. 4C) which resets relay 188 and thereby resets the system as will be described below.

As noted above, the pressure in line 18 must initially be set at the relatively low normal operating pressure. As such, the operating circuit 32 must not generate the pump solenoid signal PS when the system is first turned on. The pump enable signal PS is generated by an optically isolated solid state relay 44 whose contacts are connected between an A.C. source 45 and the pump solenoid 32. The relay 44 is normally opened and will be closed whenever a binary "1" is applied to its control input C. Whenever the relay is closed, the A.C. source 45 will be connected to the output of relay 44 and the pump solenoid signal PS will be generated.

To ensure that the pump solenoid signal PS is not generated when the fluid supply means 14 is first turned on, operating circuit 32 must apply a binary "0" to the control input of relay 44 (FIG. 4B). To this end, the reset signal R is applied to both the reset input RST of the high pressure lube duration counter 68 via OR gate 70 and to the reset input RST of a flip-flop 74 which forms part of the mode select circuit 76 (see FIG. 5). The reset signal R applied to the reset input of the high pressure lube duration counter 68 causes the output O of the counter 68 to assume the binary "1" level. This signal is applied to an inverter 78 whose output defines the high pressure lube duration signal $\overline{HPLD}$ which is applied to one input of OR gate 80. Since the output O of counter 68 is at the binary "1" level, the high pressure lube duration signal $\overline{HPLD}$ applied to OR gate 80 will be at the binary "0" level. The remaining input of OR gate 80 receives the continuous mode signal CT generated by flip-flop 74 (FIG. 5). Since flip-flop 74 has been reset by the reset signal R, its Q output will be at the binary "0" level with the result that both inputs to OR gate 80 will be at the binary "0" level. This will cause OR gate 80 to apply a binary "0" to the control input C of rely 44 with the result that the pump solenoid signal PS will not be generated, the solenoid value 32 will be disabled and the output of pump 29 will be connected to the bypass valve 37 and lubricating fluid will be supplied to the line 18 at the lower rate.

With the pump 29 turned on and pumping the bypass valve 37, and with the timers 50, 72, 102 and 114 of the operating circuit 32 having been reset, the operating circuit 32 is now ready to begin a series of timing sequences which will result in the lubricating system 10 being operated in the mode (continuous, intermittent or cyclic) selected by the operator of the system. To this end, start-up timer 36 (FIG. 4A) causes its O2 output to switch from the binary "1" (this level is assumed upon receipt of the START signal by timer 36) to the binary "0" level approximately three seconds after the generation of the START signal. The O2 output of start-up timer 36 will remain at this level until the main power switch SWP is opened and again closed, or until the operator of system 10′ depresses the reset switch SW1 which reinitiates the operation of start-up timer 36. The reset switch SW1 is a normally open switch which is spring biased into the open position and can be momentarily closed by the operator of system 10′.

The O2 output of start-up timer 36 is applied to the reset input of the low pressure sensor delay counter 82, which forms part of the low pressure sensor delay timer 84, via an OR gate 86. This resets the count in counter 82 to zero and causes the output O of counter 82 to assume the binary "1" level. The O2 output of start-up timer 36 is also applied to an inverter 88 whose output is applied to the input of a one-shot 90. When the O2 output of the start-up timer 36 switches assumes binary "0" level, the output of the inverter 88 assumes to the binary "1" level causing the one-shot 90 to generate a single positive going pulse at its output. This pulse is applied to the trigger input T of counter 82 via OR gate 92. Counter 82, as well as the remaining counters 46, 68, 98 and 112, is preferably formed using a plurality of cascaded programmable CMOS counter/timers sold by Intersil under the product desigination ICM 7260IJE and 7250IJE. Counter 82 responds to the pulse applied to its trigger input T by counting clock pulses which are generated by the counter at a preset frequency. Counter 82 compares its stored count with a digital signal generated by BCD rotary switch 94 and continues counting until its stored count is equal to the value determined by the switch 94. As long as the count in counter 82 remains below this value, the counter 82 will continue timing and its O output will remain at the binary "0" level.

The position of switch 94, and, therefore, the digital signal generated thereby, can be adjusted by the operator of lubricating system 10 and preferably enable the operator at system 10 to select a low pressure sensor delay time interval (the time interval during which the counter 82 is counting) of between 10 and 990 seconds. The length of time selected by the operator of system 10 is chosen to be sufficiently long to ensure that the pressure at the downstream end of the main line 18 will have time to rise above the value detected by low pressure sensor 28 after the fluid supply means 14 has initially been enabled and in the absence of any faults in the main line 18.

When the count in counter 82 is equal to that set by switch 94, the zero output of counter 82 jumps to the binary "1" level defining the end of the low pressure sensor delay time interval. The O output of counter 82 defines a low pressure sensor delay signal LPSD which is at the binary "0" level during the low pressure sensor delay time interval and is at the binary "1" level at all other times. This signal is applied to the pressure sensor interface 56 of the fault detector circuit 34 (FIG. 5C) and prevents the fault detector circuit 34 from responding to generation of an erroneous low pressure fault signal $P_L$ generated during the low pressure sensor delay time interval. The low pressure sensor delay signal LPSD is also applied to both AND gate 38 and OR gate 86. As a result, the count in counter 82 is reset to zero and the output of AND gate 38 assumes the binary "1" level at the end of the low pressure sensor delay time interval. The binary "1" appearing at the output of AND gate 38 causes one-shot 96 to generate a positive going pulse which is applied to the trigger input T of low pressure lube duration counter 98 via OR gate 100. The low pressure lube duration counter 98 forms part of the low pressure lube duration timer 102 which controls the length of the low pressure lube duration time interval during which the pressure in the line 18 is nominally maintained at the normal operating pressure.

The operation of counter 98 is identical to that of counter 82 with the result that the output O of counter 98 will switch to the binary "0" level when the trigger pulse is applied to the trigger input T of the counter 98 and will return to the binary "1" level when the counter in counter 98 reaches the level determined by BCD rotary switch 104. The counter 98 also includes a second output MIN which generates a single pulse once every minute during the operation of counter 98. This pulse is applied to the reset signal of a flip-flop 144 forming part of the pause timer circuit and causes the $\overline{Q}$ output of flip-flop 144 to be set at the binary "1" level. The purpose of this signal will be described in further detail below.

When the count in counter 98 reaches the value set by switch 104, the output O of counter 98 will switch to the binary "1" level indicating the end of the low pressure lube duration interval. The output O of counter 98 defines a low pressure lube duration signal LPLD which is at the binary "0" level during the low pressure lube duration time interval and it is at the binary "1" level at all other times. The low pressure lube duration signal LPLD is applied to the reset input RST of counter 98 via OR gate 106 and resets the count in the counter at the end of the low pressure lube duration time interval. It is also applied to the input of a one-shot 108 via OR gate 110 with the result that the one-shot 108 generates a single pulse which is applied to the trigger inputs T of high pressure lube duration counter 68 (FIG. 5B) and high pressure sensor delay counter 112 at the end of the low pressure lube duration time interval. This pulse initiates a high pressure lube duration time interval whose duration is determined by the high pressure lube duration timer 72. The remaining input of OR gate 110 is connected to a test switch SW2 which enables the operator of system 10 to initiate a high pressure test interval at any time by depressing the switch SW2.

Upon receipt of the trigger pulse at its trigger input T, high pressure lube duration counter 68 initiates the high pressure lube duration time interval by causing its O output to switch to the binary "0" level. The output O is connected to an inverter 78 whose output generates a high pressure lube duration signal $\overline{HPLD}$ which is at the binary "1" level during the high pressure lube duration time interval and is at the binary "0" level at all other times. The high pressure lube duration signal $\overline{HPLD}$ is applied to the solenoid output circuit 44 via OR gate 80 and causes the solenoid output circuit 44 to generate the pump solenoid signal PS during the high pressure lube time interval. The pump enable signal PE is applied to the solenoid valve 32 and causes the output of pump 14 to be applied to check valve 39 with the result tht the pressure in main line 18 will attempt to increase to the test pressure level during the high pressure lube time interval. The $\overline{HPLD}$ signal is also applied to pressure sensor interface 56 (FIG. 4C) and permits the pressure sensor interface 56 to generate a fault signal FLT in response to a high pressure fault signal $P_H$ once the high pressure sensor delay signal HPSD generated by high pressure sensor delay timer 114 returns to the binary "1" level.

The high pressure sensor delay signal HPSD is generated during a high pressure sensor delay time interval initiated at the beginning of the high pressure lube duration time interval in response to the pulse generated by one-shot 108 and which lasts for a period which is selected by the operator of system 10 by adjusting the position of BCD rotary switch 118. During the high pressure sensor delay period, the fault detector circuit 34 will not respond to erroneous high pressure fault signal $P_H$ generated by high pressure sensor 30.

Upon receiving the pulse generated by one-shot 108, the output O of counter 112 jumps from the binary "1" to the binary "0" level and the counter 112 begins counting at the preset clock frequency of the counter. The high pressure sensor delay signal HPSD remains at the binary "0" level until the count in counter 112 reaches the count determined by switch 118. Preferably, the switchis settable for a time period of between 10 and 990 seconds. The operating of system 10 will select a delay time interval which is sufficiently long to ensure that the pressure at the downstream end of line 18 will rise above the preset level being detected by high pressure sensor 30 when the fluid supply means 14 is first operated at the higher pump rate and when there are no faults in the lubricating system 10. The high pressure sensor delay time period set by switch 118 will be selected to be shorter than the high pressure lube duration time interval set by switch 118 to ensure that the high pressure sensor delay time interval ends before the high pressure lube duration time interval.

When the count in high pressure sensor delay counter 112 reaches the value determined by switch 118, its output O will return to the binary "1" level with the result that the HPSD signal also returns to the binary "1" level and will enable fault detector circuit 34 to generate a fault signal if the high pressure fault signal $P_H$ is generated any time during the remainder of the high pressure lube duration time interval determined by timer 72. The binary "1" appearing at the O output of counter 112 is also applied to the reset input of counter 112 via OR gate 120 so as to reset the counter and condition it to initiate another high pressure sensor delay time interval in response to the generation of a new output pulse by low pressure lube duration timer 102.

Up to this point, the manner in which the system operating circuit 32 controls the operation of lubricating system 10 is the same for the intermittent, the continuous and the cyclic modes of operation. Hereinafter, the operation of the system is determined by the mode selected by the operator of system 10'.

Referring to FIG. 5, the operating of system 10' can manually select the mode of operation to be carried out by operating circuit 32 by closing one of the switches SW3, SW4 or SW5. These switches are preferably closed using a jumper such as that sold by Sealectro Corp. under the trademark JUMP-JAX. However, normally open switches, can also be used.

If none of the switches SW3–SW5 are closed, the inverters 122, 124 and 126 disable all of the AND gates 128, 130 and 132. When any one of the switches SW3 is closed by the operator of system 10, a binary "1" will appear at the output of the corresponding inverter 122–126 thereby enabling the corresponding AND gate 128–132. When switch SW3 is closed, AND gate 128 will be enabled, and the system 10' will be operated in the intermittent mode. When the switch SW4 is closed, and AND gate 130 will be enabled, and the system 10' will be operated in the continuous mode. When the switch SW5 is closed, the AND gate 132 will be enabled and the system 10' will be operated in the cyclic mode. Operation in each of these modes will now be described.

In the continuous mode, the switch SW4 is closed and the AND gate 130 is enabled. During the high pressure lube duration interval, the high pressure lube duration signal $\overline{HPLD}$ assumes the binary "0" level causing the output of AND gate 130 to assume the binary "0" level. At the end of the high pressure lube duration time interval, the high pressure lube duration signal $\overline{HPLD}$ assumes the binary "1" level causing the output of AND gate 130 to assume the binary "1" level. A flip-flop 74 responds to this signal by causing its Q output to assume the binary "level" thereby generating the continuous mode signal CT. As shown in FIG. 4B, this signal is applied to the control input C of relay 44 via OR gate 88 and causes the relay 44 to generate the pump solenoid signal PS thereby ensuring that the output of pump 29 will be connected to check valve 39 even after the high pressure lube duration time interval is over. The Q output of the flip-flop 74 is latched at this level until a new reset signal R is generated in response to opening and closing of main power switch SWP or the closing of reset switch SW1. As such, the pressure in line 18 will be maintained at the test pressure until the switch SW1 is closed or until the system is shut off.

When the operator of system 10 wishes to operate the system in the intermittent mode, he closes switch SW3 (FIG. 5) thereby enabling the AND gate 128. The output of AND gate 128 is connected to an inverter 134 whose output is connected to the input of a one-shot 136. One-shot 136 will generate a single pulse IT at its output whenever the output of AND gate 128 switches from the binary "1" level to the binary "0" level.

During the high pressure lube duration time interval, the high pressure lube duration signal $\overline{HPLD}$ is at the binary "1" level causing relay 44 to generate the pump solenoid signal PS. At the end of the high pressure lube duration time interval, the high pressure lube duration signal $\overline{HPLD}$ assumes the binary "0" level causing the relay 44 to cease generating the pump solenoid signal PS with the result that the output of pump 29 is connected to the bypass valve 37 and lubricating fluid is supplied to line 18 at the lower rate. The return of the high pressure lube duration signal $\overline{HPLD}$ to the binary "0" level also causes one-shot 136 to generate the intermittent mode pulse IT at its output. This signal is applied to the trigger input T of low pressure lube duration timer 98 (FIG. 4A) via OR gate 100 and reinitiates the low pressure lube duration time interval. At the end of this time interval, the low pressure lube duration timer 102 generates an output pulse which is applied to the trigger input of the high pressure lube duration counter 68 and reinitiates the high pressure lube duration time interval. The entire process is continuously repeated until either the reset switch SW1 is closed or until power to the lubricating system 10 is turned off.

When the operator of system 10 wishes to operate the system in the cyclic mode, he closes switch SW5 (FIG. 5) enabling AND gate 132. The output of AND gate 132 is connected to an inverter 140 whose output is connected to a one-shot 142. The one-shot 142 generates the cyclic mode pulse CY whenever the output of inverter 140 switches from the binary "0" to the binary "1" level.

During the high pressure lube duration time interval, the high pressure lube duration signal $\overline{HPLD}$ will be at the binary "1" level with the result that the output of inverter 140 will be at the binary "0" level. At the end of the high pressure lube duration time interval, the high pressure lube duration signal $\overline{HPLD}$ assumes a binary "0" level which causes inverter 140 to assume the binary "1" level and thereby causes one-shot 142 to generate the cyclic mode pulse CY.

The cyclic mode pulse CY is applied to the pause timer 50 (FIG. 4A) and initiates a pause time interval during which a fluid supply means 14 is disabled and during which the fault detector circuit 34 will be prevented from generating a system fault signals in response to the generation of an erroneous high or low pressure fault signal $P_H$ or $P_L$. The cyclic mode pulse CY is applied to both the trigger input T of pause counter 46 and to the input of flip-flop 144. This causes the $\overline{Q}$ output of flip-flop 144 (which output defines the pump disable signal PD) to assume the binary "0" level. The pump disable signal PD is applied to the pressure sensor interface 56 and ensures that the pressure sensor interface 56 will not respond to the generation of erroneous high or low pressure fault signals $P_H$ or $P_L$.

Upon receipt of the cyclic mode pulse CY, the pause counter 46 initiates a pause time interval whose duration is determined by the position of switch 146 whose position may be set by the operator of lubricating system 10' and preferably enables the operator to select a pause time interval of between 10 and 90 minutes. Upon receipt of the cyclic mode pulse signal CY, the counter in counter 46 is reset to zero and the O output of counter 46 assumes the binary "0" level. At this level, the pause time duration signal PTD disables AND gate 60 thereby disabling the relay 42 and causing the fluid supply means 14 to be shut off. The pause time duration signal PTD will stay at the binary "0" level until the count in counter 46 reaches the level determined by switch 146. At this point, the output O of pause counter 46 returns to the binary "1" level thereby reenabling AND gate 60 and causing the relay 42 to reenable the fluid supply means 14. The transition of the pause time duration signal PTD from the binary "0" to the binary "1" level also causes the count in counter 46 to be reset and causes one-shot 148 to generate an output pulse which is applied to the trigger input T of low pressure sensor delay counter 82. This has the effect of sequentially reinitiating operation of the low pressure sensor delay timer 84, the low pressure lube duration timer 102, the high pressure lube duration timer 72 and the high pressure sensor delay timer 114 with the result that a new test cycle (low pressure lube operation followed by high pressure lube operation) is initiated. The entire process continues in this cyclic manner until the reset switch SW1 is closed or until power to the system 10' is shut off.

Having described the operation of the system operating circuit 32, the operation of the fault detector circuit 34 will now be described with reference to FIG. 4C.

The heart of fault detector circuit 34 is a pressure sensor interface 56 which generates a fault signal FLT (the fault signal will be considered to be generated when the Q output of flip-flop 52 is at the binary "1" level) whenever the high or low pressure fault signals $P_H$ or $P_L$ indicator a non-erroneous fault condition. As indicated above, the Q output of flip-flop 52 is initially set at the binary "0" level by the reset signal R. The Q output of the flip-flop 52 remains at the binary "0" level until the output of AND gate 150 switches from the binary "0" to the binary "1" level. As will be described below, the output of AND gate 150 will normally be at the binary "0" level and will switch to the binary "1" level only when the high or low pressure fault signals $P_H$ or $P_L$ indicate a non-erroneous fault condition.

The four inputs or AND gate 150 are connected to the output of OR gate 152, to the pause delay signal PD, to the output of inverter 154 and to the low pressure sensor delay signal LPSD, respectively. The input of inverter 154 receives the reset signal R with the result that the AND gate 150 will be disabled during the initial start-up period of control circuit 12' wherein the reset signal R is at the binary "1" level. This ensures that the Q output of flip-flop 52 will not be latched to the binary "1" level due to erroneous signals which may be generated during the initial start-up period in which various circuits are being reset.

As described above, the low pressure fault signal $P_L$ will erroneously be generated both when the fluid supply means 14 is shut off (during the pause time duration interval) and when the fluid supply means 14 has just been turned on but sufficient time has not passed to ensure that the pressure at the downstream end of line 18 has had an opportunity to rise above the pressure level being sensed by low pressure sensor 28 (assuming no faults in the line 18). In order to ensure that an erroneous fault signal FLT is not generated during these periods, the pause delay signal PD and the low pressure sensor delay signal LPSD are applied to respective inputs of AND gate 150. As indicated above, the pause delay signal PD will be set at the binary "0" level at the beginning of the pause time duration time interval and will stay at this level until approximately one minute after the initiation of the low pressure lube duration time interval. As also described above, the low pressure sensor delay signal LPSD will be at the binary "0" level during a low pressure sensor delay time interval. As such, the PD and LPSD signals will disable AND gate 150 and prevent the output of AND gate 150 from switching to the binary "1" level in response to the generation of the low pressure fault signal $P_L$ at the lower input of OR gate 152 during these time periods. At all other times, the pause delay signal PD and the low pressure sensor delay signal LPSD will be at the binary "1" level and the generation of the low pressure fault signal $P_L$ by low pressure sensor 28 will non-erroneously indicate a fault condition and will cause the output of AND gate 150 to switch to the binary "1" level. This causes the Q output of flip-flop 52 to switch to the binary "1" level thereby generating the fault signal FLT.

As further noted above, the high pressure fault signal $P_H$ will erroneously be generated when the fluid supply means 14 is off, when the fluid supply means 14 is being operated at the low pump rate (first pressure mode), and when the fluid supply means 14 has initially been switched from the low to the high pump rate (second pressure mode) but sufficient time has not passed to enable the pressure at the downstream end of line 18 to rise above the level being detected by high pressure sensor 30 (i.e., during the high pressure sensor delay time interval).

In order to ensure that the generation of an erroneous high pressure fault signal $P_H$ during this period does not cause generation of an erroneous fault signal FLT, the high pressure fault signal $P_H$ is applied to one input of an AND gate 156 which is disabled during these periods. To this end, the upper input of AND gate 156 is connected to the output of an AND gate 158 whose lower input receives the high pressure sensor delay signal HPSD and whose upper input receives the output of OR gate 160. The inputs of OR gate 160 are connected to the continuous mode signal CT and the high pressure lube duration signal $\overline{HPLD}$. Either the continuous mode signal CT or the high pressure lube duration signal $\overline{HPLD}$ will be at the binary "1" level whenever the pump 14 is operated at the higher pump rate. As such, a binary "1" will be applied to the upper input of AND gate 158 whenever the pump 14 is being operated at this higher rate. The high pressure sensor delay signal HPSD will be at the binary "0" level during the high pressure sensor delay time interval and will disable AND gate 158 during this interval. Only when the high pressure sensor delay time interval has passed, and the pump 14 is being operated at the higher pump rate, will the output of AND gate 158 be at the binary "1" level. As a result, only high pressure fault signals $P_H$ during this period will be permitted to cause the generation of the fault signal FLT. As such, pressure sensor interface 56 ensures that the flip-flop 52 will not generate the fault signal FLT in response to an erroneous high pressure fault signal $P_H$.

The fault signal FLT generated by flip-flop 52 is applied to both the fault delay timer 58 and to the fault signal output circuit 162. Fault output circuit 162 generates fault and safe indicator signal which are applied to a fault indicator lamp and a safe indicator lamp, respectively, immediately upon a generation of a fault signal FLT by pressure sensor interface 56. Fault signal output circuit 162 also generate an A.C. and a D.C. fault signal either in response to the fault signal FLT generated by pressure sensor interface 56 or in response to the delayed fault signal DFLT generated by fault delay timer 58. The delayed fault signal DFLT will be generated (i.e., will be placed at the binary "1" level) a preset time period after the generation of the fault signal FLT depending upon the position of switch 164 which may be set by the operator of system 10. The amount of the delay, which is preferably settable between 1 and 90 minutes, is selected by the operator of system 10 to meet his particular needs. For example, if the machine being lubricated is machining gears and if the maximum time required to fully machine a single gear is 20 minutes, the fault delay time interval defined by fault delay timer 58 will be selected to be at least 20 minutes long.

The fault delay time interval is initiated when one-shot 166 generates a single pulse at its output in response to the generation of the fault signal FLT. This pulse is applied to the trigger input T of fault delay counter 168 causing the output O of counter 168 to switch to the binary "0" level and resetting the internal count of the counter to zero. The counter 168 then begins counting at its internal clock rate until the count in counter 168 is equal to the value selected by switch 164. This time, the O output of fault delay counter 168 returns to the binary "1" level signalling the end of the fault delay time interval. The binary "1" appearing at the output O of fault delay counter 168 serves to reset counter 168 (via OR gate 170) and also causes the Q output of flip-flop 54 to switch to the binary "1" level thereby generating the delayed fault signal DFLT. The output of flip-flop 54 latches at this level until the reset switch SW1 is closed (or power switch SWP is opened and again closed) and start-up timer 36 causes the generation of a new reset signal R.

The fault signal output circuit 162 receives both the fault signal FLT generated by pressure sensor interface 56 and the delayed fault signal DFLT generated by fault delay timer 58. Fault output circuit 168 includes a pair of opto-isolators 172, 174 whose outputs are connected to a fault indicator lamp 176 and a safe indicator lamp 178, respectively. The control input C of opto-isolater 172 is connected directly to the Q output of flip-flop 52 while the control input C of opto-isolator 174 is coupled to the Q output of flip-flop 52 via an inverter 180. Each opto-isolator 172, 174 applies a D.C. voltage to its respective lamp 176, 178, when a binary "1" appears at its control input. As a result, the safe indicator lamp 78 will be lit whenever the Q output of flip-flop 52 is at the binary "0" level (i.e., when fault signal FLT is not generated) and the fault indicator lamp 178 will be lit whenever the Q output of the flip-flop 52 is at the binary "1" level (i.e., when the fault signal FLT is generated). As such, the indicator lamps 178, 178 will indicate the presence or absence of a fault condition immediately upon the detection of such condition by a fault detector circuit 34.

Fault output circuit 168 also generates the A.C. and D.C. system fault signals in response to either the fault signal FLT or the delayed fault signal DFLT. The operator of system 10 determines which of these signals causes the generation of the A.C. and D.C. system fault signal by closing appropriate contacts of switches SW6 and SW7. In the presently preferred embodiment, these contacts are closed using jumpers, although two position bi-stable switches could also be used. When the operator of system 10 desired to have the D.C. fault signal generated immediately upon the detection of a fault condition, he connects contacts A and B of switch SW6. When he wishes to have the signal generated only after the delay time interval defined by fault delay timer 58, he connects contacts A and C of switch SW6. The operator of system 10 determines whether the A.C. system fault signal is generated immediately upon the detection of a fault condition or after the delay instituted by fault delay timer 58 in a similar manner by connecting either contacts A and B of switch SW7 or contacts A and C of switch SW7.

The D.C. system fault signal is generated by an opto-isolator 182 which generates the D.C. signal at its output whenever its control input C is at the binary "1" level. As such, the D.C. system fault signal will be generated in response to the fault signal FLT when contacts A and B of switch SW6 are connected and will be generated in response to the delayed fault signal DFLT whenever the contacts A and C of switch SW6 are connected.

The A.C. system fault signal is generated by an optically isolated solid state relay whose input contact is connected to the A.C. source 31 and whose output contact defines the A.C. system fault signal. Relay 184 will be closed, causing the A.C. system fault signal to be generated, whenever a binary "1" appears on its control input C. The control input of relay 184 is connected to the output of a dual latching relay 188 which is identical in structure to latching relay 64. The contact 190 of relay 174 is preset in the open position with the result that a binary "0" is applied to the control input C of relay 184 thereby preventing relay 184 from generating the A.C. system fault signal. The relay 188 is latched in this position until either the fault signal FLT is generated by pressure sensor interface 56 or until the delay fault signal DFLT is generated by fault delay timer 58, depending upon which of the contact switches SW7 is closed. Once the appropriate fault signal is generated, the contact 190 of the relay 188 is latched closed causing a binary "1" to be applied to relay 184 with the result that the A.C. system fault signal is generated. Relay 188 will remain latched in this position, and the A.C. system fault signal will continue to be generated, until the relay 188 is manually reset by the operator of the system 10' by closing the normally open reset switch SW9B (this switch is ganged with switch SW9A as described above), thereby resetting the system.

The fault detector circuit 34 also includes a switch SW8 which enables the operator of system 10 to determine whether the stop pump signal SPP is generated in response to the fault signal FLT or in response to the delayed fault signal DLFT. When the operator wishes to generate the stop pump signal SPP in response to the generation of the fault signal FLT, he will connect the contacts A and B of switch SW8. When he wishes to have the stop pump signal SPP generated in response to the generation of the delayed fault signal DFLT, he connects the contacts A and C of switch SW8.

The present invention may be embodied in other specific forms without departing from the spirit or essential attributes thereof and, accordingly, reference shuld be made to the appended claims, rather than to the foregoing specification, as indicating the scope of the invention.

What is claimed is:

1. A lubricating system, comprising:
   a fluid distribution system for distributing a lubricating fluid to one or more parts of an operating machine; and
   a control system for controlling the operation of said fluid distribution system, said control system including first means for detecting a non-erroneous fault condition in said fluid distribution system and generating a first signal in response thereto and second means for generating a delayed fault signal indicative of the presence of said non-erroneous fault condition a preset time interval after said first signal is generated irrespective of whether said fault condition continues after the generation of said first signal.

2. The lubricating system of claim 1, wherein said preset time interval may be manually set by the operator of said lubricating system.

3. The lubricating system of claim 1, wherein said control system responds to the generation of said delayed fault signal by disabling said fluid distribution system.

4. The lubricating system of claim 1, wherein said control system generates a system fault signal in response to the generation of said delayed fault signal, said system fault signal being applied to the control circuit of the operating machine being lubricated and causing the operating machine to be shut down.

5. A lubricating system according to claim 1, wherein said fluid distribution system comprises a fluid supply means for supplying lubricating fluid from a fluid reservoir into a main fluid line which carries said lubricating fluid to one or more indicator blocks, each of said indicator blocks supplying lubricating fluid to one or more secondary lines associated with that indicator block, each of said secondary lines terminating in a metering device which supplies lubricating fluid to a part to be lubricated, said fluid supply means being operable in a first pressure mode wherein lubricating fluid is supplied to said main line at a first rate which causes the pressure in said main line to be nominally maintained at a predetermined normal operating pressure and a second pressure mode wherein lubricating fluid is suplied to said main line at a second rate, higher than said first rate, which causes the pressure in said main line to be nominally maintained at a test pressure which is higher than said normal operating pressure, each of said metering devices responding to a fault condition in either its associated secondary line or the metering device connected thereto by dumping a substantial portion of the lubricating fluid from said main line to the atmosphere when said fluid supply means is operated in said second pressure mode such that the pressure of the fluid in said main line at a position downstream of said indicator blocks falls below said test pressure.

6. The lubricating system of claim 5, wherein said control system includes:
   a high pressure sensor for generating a high pressure fault signal when the pressure at said position downstream of said indicator blocks falls below a predetermined high pressure level which is greater than said normal operating pressure but less than said test pressure;
   a low pressure sensor for generating a low pressure fault signal whenever the pressure at said position downstream of said indicator blocks is less than a low pressure level which is lower than said normal operating pressure; and
   a control circuit which controls the operation of said fluid distribution system and includes said detecting means.

7. A lubricating system according to claim 6, wherein said detecting means generates said fault signal in response to the generation of said low pressure fault signal at any time except for a predetermined time interval immediately following the time said fluid supply means is first turned on.

8. The lubricating system of claim 7, wherein said predetermined time interval may be set by the operator of said lubricating system.

9. The lubricating system of claim 7, wherein said preset time interval is sufficiently long to ensure that the pressure of the lubricant in said main line downstream of said metering devices can increase above said low pressure level in the absence of a fault condition in said main line.

10. The lubricating system of claim 6, wherein said control circuit is capable of operating said fluid distribution system at any one of a plurality of operating modes at the option of the operator of said lubricating system.

11. A lubricating system, comprising:
   a fluid distribution system for distributing lubricating fluid to one or more parts of an operating machine;
   a fluid supply means for supplying lubricating fluid from a lubricant reservoir to said fluid distribution system at such a rate that the pressure in said fluid distribution system is normally above a predetermined value in the absence of a fault in said fluid distribution system;
   a low pressure sensor for generating a low pressure fault signal whenever the pressure at a predetermined location in said fluid distribution system falls below said predetermined level; and
   a control system for controlling the operation of said fluid distribution system, said control system shutting down said fluid supply means in response to the generation of said low pressure fault signal at any time after an initial low pressure sensor delay time interval which begins when said fluid supply means is first turned on and which ends a sufficient time after said fluid supply means is turned on so that the pressure of said fluid at said predetermined location in said fluid distribution system will be above said predetermined level in the absence of faults in a main line of said fluid distribution system.

12. The lubricating system of claim 11, wherein said fluid distribution system comprises said main fluid line which carries lubricating fluid from said fluid supply means to one or more indicator blocks, each of said indicator blocks supplying lubricating fluid to one or more secondary lines associated with that lubricating block, each of said secondary lines terminating in a metering device which supplies lubricating fluid to a part to be lubricated, said fluid supply means being operable in a first pressure mode wherein the pressure in said main line is nominally maintained at a predetermined normal operating pressure which is higher than said predetermined level and a second pressure mode wherein lubricating fluid is supplied to said main line at a second rate, higher than said first rate, wherein the pressure in said main line is nominally maintained at a test pressure which is higher than said normal operating pressure, each of said metering devices responding to a fault condition in either its associated secondary line or the metering device connected thereto by dumping a substantial portion of the lubricating fluid from said main line to the atmosphere when said fluid supply means is operated in said second pressure mode such that the pressure of fluid in said main line at a position downstream of said indicator blocks falls below said test pressure.

13. The lubricating system of claim 12, further including a high pressure sensor for generating a high pressure fault signal whenever the pressure at said position downstream of said indicator blocks falls below a predetermined high pressure level which is greater than said normal operating pressure but less than said test pressure, said control circuit shutting down said fluid supply means in response to the generation of said high pressure fault signal whenever said fluid supply means is operated in said second pressure mode but after an initial high pressure sensor delay time interval which begins when said fluid supply means is first operated in said second pressure mode and which ends a sufficient time after said fluid supply means is operated in said second pressure mode that the pressure of said fluid at said position downstream of said indicator blocks will be above said predetermined high pressure level in the absence of faults in said secondary lines and/or said metering devices.

14. A lubricating system according to claim 13, wherein said control system is capable of operating said fluid distribution system in any one of a plurality of different operating modes at the option of the operator of said system.

15. The lubricating system of claim 14, wherein said operating modes include a first operating mode wherein said fluid supply means is first operated in said first pressure mode for a first predetermined time period and is thereafter operated in said second pressure mode until said system is turned off and a second operating mode wherein said fluid supply means is periodically switched between said first pressure mode and said second pressure mode.

16. A lubricating system, comprising:
   (A) a fluid distribution system for distributing a lubricating fluid to one or more parts of an operating machine; and
   (B) a control system for controlling the operation of said fluid distribution system in any one of a plurality of different operating modes at the option of the operator of said system, said modes including:
(1) a first operating mode wherein the pressure of the lubricating fluid in a main fluid distribution line of said fluid distribution system is initially set at a normal operating pressure and is then increased to a high test pressure, substantially higher than said normal operating pressure and is maintained at said high test pressure until said lubricating system is shut down; and
(2) a second operating mode wherein the pressure in said main line of said fluid distribution system is switched between said normal operating pressure and said test pressure several times during the operation of said lubricating system.

17. The lubricating system of claim 16, wherein said fluid distribution system includes a fluid supply means supplying lubricant fluid from a lubricant reservoir to said main fluid distribution line and wherein said fluid supply means is operable in a first pressure mode wherein said fluid supply means supplies fluid to said main line at a rate corresponding to said normal operating pressure and a second pressure mode wherein said fluid supply means supplies fluid to said main line at a rate corresponding to said test pressure.

18. The lubricating system of claim 17, wherein said control system continually switches said fluid supply means between said first pressure mode and said second pressure mode when operating said fluid distribution system in said second operating mode.

19. The lubricating system of claim 17, wherein when said control system operates said system in said second operating mode, it operates said fluid supply means cyclically, each cycle including a period during which said fluid supply means is shut off, followed by a period during which said fluid supply means is operated in said first pressure mode, followed by a period during which said fluid supply means is operated in said second pressure mode.

* * * * *